United States Patent
Bach et al.

(10) Patent No.: US 11,984,776 B2
(45) Date of Patent: May 14, 2024

(54) ROTOR AND METHOD OF IMPREGNATION OF THE WINDINGS

(71) Applicant: Valeo Siemens eAutomotive Germany GmbH, Erlangen (DE)

(72) Inventors: Regina Bach, Bad Neustadt a.d.Saale (DE); Sebastian Beetz, Bad Neustadt a.d.Saale (DE); Florian Volkmuth, Bad Neustadt a.d.Saale (DE); Christoph Wieczorek, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 17/452,039

(22) Filed: Oct. 22, 2021

(65) Prior Publication Data
US 2022/0131451 A1    Apr. 28, 2022

(51) Int. Cl.
*H02K 1/04* (2006.01)
*H02K 1/16* (2006.01)
(Continued)

(52) U.S. Cl.
CPC ............... *H02K 15/12* (2013.01); *H02K 1/04* (2013.01); *H02K 1/16* (2013.01); *H02K 3/345* (2013.01); *H02K 15/024* (2013.01)

(58) Field of Classification Search
CPC .. H02K 1/16; H02K 5/15; H02K 3/50; H02K 7/006; H02K 15/0025; H02K 9/223; H02K 15/105; H02K 9/227
See application file for complete search history.

(56) References Cited

U.S. PATENT DOCUMENTS 2,683,233 A * 7/1954 Ruhl .................. H02K 3/51
                                                           310/85
7,994,681 B2 * 8/2011 Ikeya .................. H02K 1/146
                                                           310/260
(Continued)

FOREIGN PATENT DOCUMENTS

DE    102016203372 A1 *  9/2017
DE    102020101035 A1    8/2020
JP    H06245415 A        9/1994

OTHER PUBLICATIONS

DE-102016203372-A1 machine translation Dec. 24, 2022.*
Extended European Search Report issued in European Application No. 21202785.8, dated Mar. 9, 2022 (11 pages).

*Primary Examiner* — Leda T Pham
(74) *Attorney, Agent, or Firm* — Osha Bergman Watanabe & Burton LLP

(57) ABSTRACT

A rotor (1) comprising a rotor shaft (13), a rotor core (14) having a core length, windings (12), and two impregnation rings (11), the windings (12) forming protruding windings ends (121), each one of the two impregnation rings (11) comprising an annular portion (111) and a deflector portion (112), the annular portion (111) comprising radial openings (113); and a method for impregnating the rotor (1) comprising starting a rotation of the rotor shaft (13) and impregnating the windings (12) with an impregnating agent through two nozzles respectively located upward each one of the two impregnation rings (11) and oriented towards the radial openings (113), the impregnation agent being guided by the deflector portion (112) towards the protruding windings ends (121) on both sides of the rotor (1) at a same time, in order to impregnate the windings (12) through the core length.

10 Claims, 2 Drawing Sheets

(51) Int. Cl.
*H02K 3/34* (2006.01)
*H02K 15/02* (2006.01)
*H02K 15/12* (2006.01)

(56) References Cited

U.S. PATENT DOCUMENTS 9,166,454 B2 * 10/2015 Chun ................. H02K 3/00
11,349,367 B2 * 5/2022 Loos ................. H02K 7/006

* cited by examiner

ROTOR AND METHOD OF IMPREGNATION OF THE WINDINGS

FIELD OF THE INVENTION

The present invention relates to a rotor and to a method for impregnating windings of a rotor.

BACKGROUND OF THE INVENTION

Electric or hybrid vehicles comprise electric motors, in particular alternating current (AC) electric motors and inverters powering the electric motor. The motor is configured to deliver a mechanical power in order to ensure propulsion of the vehicle. This power transmission configuration is referred to as a mechanical power generation configuration. To some extent, the AC electric motors may also convert a mechanical power, for example provided by a braking action of the vehicle, onto an electric power further evacuated through the on-board high voltage AC electrical network. This power transmission configuration is referred as an electric power generation configuration.

In a general manner, the AC electric motor comprises a stator comprising stator windings, referring to a fixed part of the electric motor, and a rotor, referring to a rotating part of the electric motor. In the mechanical power generation configuration, the stator windings are configured to be supplied with an AC electrical energy and to produce a stator rotating magnetic field. The stator rotating magnetic field induces a torque in the rotor which triggers a rotation of the rotor. The rotor comprises a rotor shaft driven by the rotation of the rotor and configured to ensure the transmission of the mechanical power between the AC electric motor and an exterior driven apparatus.

The AC electric motors are in general classified into two main categories, synchronous motors and asynchronous motors, also known as induction motors.

In the synchronous motors, the rotor comprises a magnetic field generated either by permanent magnets or by rotor windings supplied with a direct current (DC) electrical energy by an external apparatus. The permanently excited synchronous motors comprising permanent magnets are commonly designated as permanent magnet AC motors (PMAC). The permanent magnets are distributed radially around a rotor axis.

In the induction motors, the stator rotating magnetic field generates an electric current in the rotor by electromagnetic induction. The induction motors are in general classified into two main categories, squirrel cage rotors and wound rotors also designated as slip-ring rotors.

The present invention relates in particular to the wound rotors. The wound rotor comprises a cylindrical rotor core, rotor windings, the rotor shaft, and slip-rings. The cylindrical rotor core extends along a longitudinal direction and consists of laminations usually made of steel. The cylindrical rotor core comprises longitudinal grooves which are evenly spaced radially. The longitudinal grooves are configured to hold the rotor windings. The rotor windings form protruding winding ends at both ends of the rotor. The windings are in general made out of copper.

The rotor windings may be impregnated with an impregnation agent in order to provide an improved electrical insulation and to reduce vibrations of the rotor.

SUMMARY OF THE INVENTION

In accordance with the present invention a rotor having impregnated windings and a method for impregnating the windings are provided. The rotor is configured to be integrated in an electric rotating machine, particularly of an electric or a hybrid vehicle.

According to the invention, the rotor comprises a rotor shaft, a rotor core, windings, and two impregnation rings.

The rotor core has a core length and comprises longitudinal grooves distributed along an outer circumference of the rotor core. The longitudinal grooves cover the core length. Moreover, the rotor core is mounted on the rotor shaft.

The windings, located within the longitudinal grooves, form protruding windings ends at each end of the rotor core.

The two impregnation rings both have an annular shape and are located at both ends of the rotor core. Each of the two impregnation rings comprises an annular portion and a deflector portion both joined to one another on an end. The annular portion comprises radial openings to inlet an impregnation agent, preferably a resin. Furthermore, the deflector portion faces the protruding windings ends. The deflector portion is configured to guide the impregnation agent from the radial openings towards the protruding windings ends, in order to impregnate evenly and in-depth the windings.

Thus, the present invention allows to impregnate completely the windings through the core length with an improved impregnation quality.

Advantageously, the two impregnation rings have a same radial position with respect to one another to ease a method for impregnating the windings.

Advantageously, the rotor comprises end shields. Then, annular portion can be mounted on the end shields.

Advantageously, the deflector portion has an accurately curved section.

Advantageously, the deflector portion comprises an inner tip. The inner tip has a terminal end located at an intermediary height of the protruding windings ends, so that to improve the even and in-depth impregnation of the windings. The intermediary height is preferably equal to a half of the protruding windings ends height.

Advantageously, the radial openings have an opening width and an opening length. Moreover, the radial openings are preferably distributed regularly along the annular portion. An opening distribution angle separates the radial openings. The opening width, the opening length, and the opening distribution angles are set to ease the application of the impregnation agent.

Advantageously, the two impregnation rings comprise annular grooves in between the radial openings. Thus, the annular grooves ensure a fluid connection between the radial openings. The annular grooves are configured to guide the impregnation agent towards the radial openings.

According to another aspect of the invention, the invention relates to a method for impregnating the rotor. The method comprises starting a rotation of the rotor shaft mounted on a rotating apparatus having a rotating velocity; and impregnating the windings while the rotor is rotating.

Two nozzles may then be respectively located upward each one of the two impregnation rings and oriented towards the radial openings. Impregnating the windings includes applying the impregnation agent from the two nozzles through the radial openings onto the protruding windings ends at a same time. The impregnation agent is guided by the deflector portion in order to impregnate the windings through the core length. Hence, the impregnation of the windings is even and in-depth.

Therefore, the present invention makes it possible to impregnate two sides of the rotor at the same time.

Furthermore, when impregnating the rotor, it is not necessary to tilt the rotor during the impregnation process, potentially allowing to reduce costs for a machine used for the impregnation.

According to a first embodiment of the invention, the two impregnation rings comprise the annular grooves. Thus, applying the impregnation agent may be performed at once.

According to a second embodiment of the invention, applying the impregnation agent is performed at regular time intervals with an application frequency and an application duration. The application frequency and the application duration both correspond to the rotating velocity, the opening length and the opening distribution angle being configured such that applying the impregnation agent is occurring when the radial openings are facing the two nozzles. Provided that the two impregnation rings have the same radial position with respect to one another, the two nozzles have preferably same settings.

Advantageously, applying the impregnation agent consists in spraying the impregnation agent through the radial openings.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

The invention will be better understood on reading the description that follows, and by referring to the appended drawings given as non-limiting examples, in which identical references are given to similar objects and in which.

DETAILED DESCRIPTION

Several embodiments of the present invention will be detailed hereafter with reference to the drawings. It will be apparent to those skilled in the art from this present disclosure that the following description of these embodiments of the present invention are provided for illustration only and not for the purpose of limiting the invention as defined by the appended claims and their equivalents.

According to an aspect of the invention, the invention relates to a rotor of an electric rotating machine configured to be on board an electric or a hybrid vehicle. The rotor refers to a rotating part of the electric rotating machine. In the present disclosure, the rotor relates to any rotor comprising impregnated windings, in particular a wound rotor.

Figure 1:
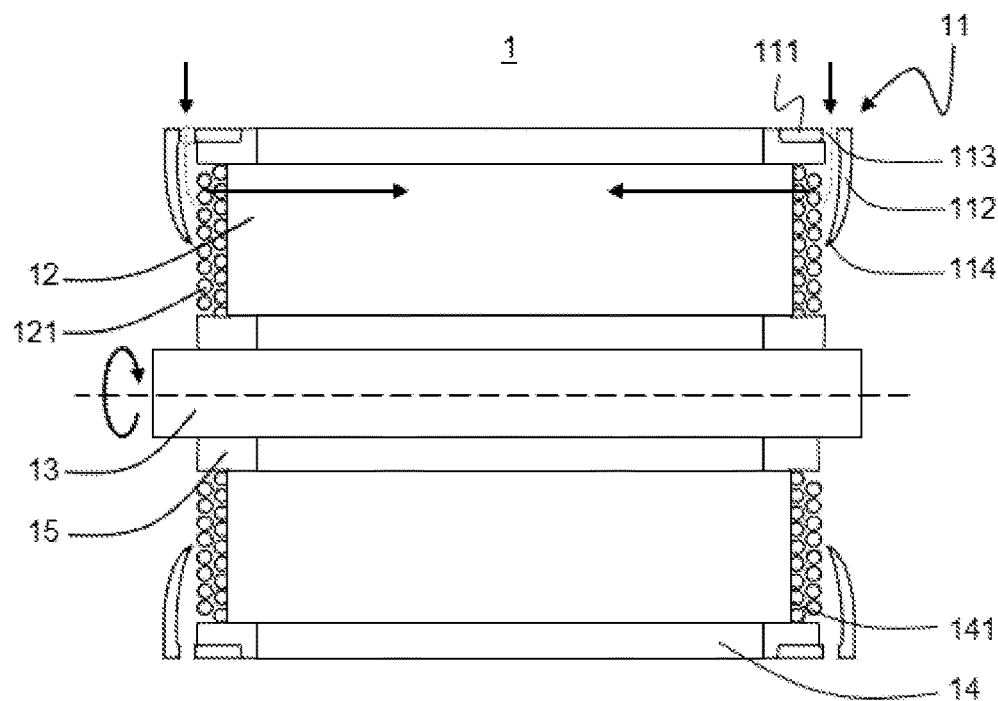
FIG. 1 illustrates a cross-sectional view of a rotor according to an embodiment of the invention.

As illustrated in FIG. 1, the rotor 1 according to the invention comprises a rotor shaft 13, a rotor core 14, windings 12, and two impregnation rings 11. The rotor core 14 has a core length and comprises longitudinal grooves 141 distributed along an outer circumference of the rotor core 14.

The longitudinal grooves 141 cover the core length. The rotor core 14 is mounted on the rotor shaft 13. The windings 12 are located within the longitudinal grooves 141. The windings 12 form at each end of the rotor core 14, protruding windings ends 121. The two impregnation rings 11 both have an annular shape and are located respectively at both ends of the rotor core 14. Thus, the rotor shaft 13, the rotor core 14, and the two impregnation rings 11 are coaxial.

Figure 2:
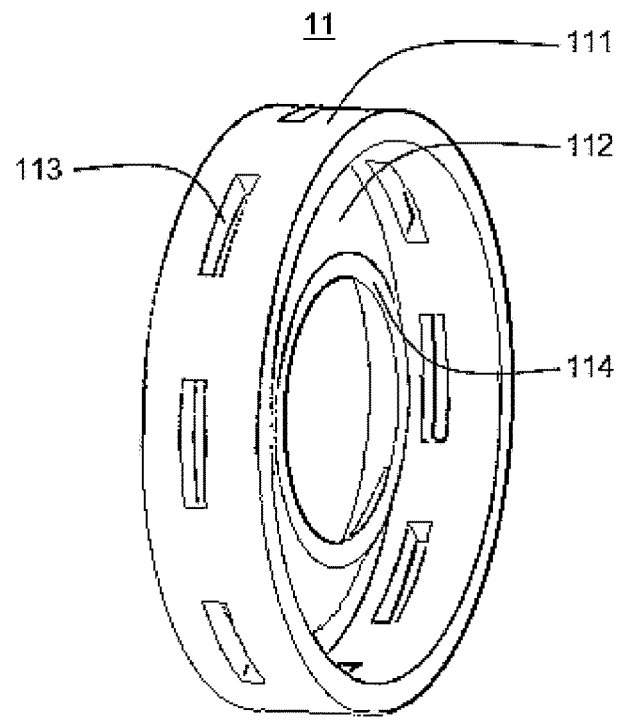
FIG. 2 illustrates a view of an impregnation ring according to an embodiment of the invention.
Figure 3:
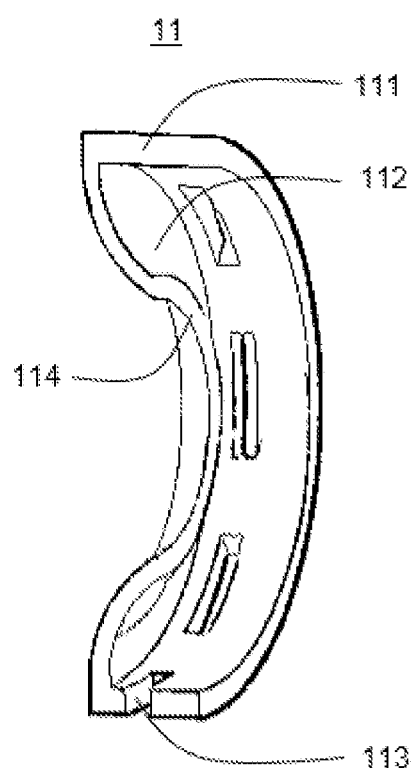
FIG. 3 illustrates a cross-sectional view of the impregnation ring according to an embodiment of the invention.

As illustrated in FIGS. 2 and 3, each one of the two impregnation rings 11 comprises an annular portion 111 and a deflector portion 112 both joined to one another on an end. The annular portion 111 comprises radial openings 113 to inlet an impregnation agent, preferably a resin. Moreover, the deflector portion 112 faces the protruding windings ends 121. The deflector portion 112 is configured to guide the resin from the radial openings 113 towards the protruding windings ends 121, in order to impregnate evenly and in-depth the windings 12.

Furthermore, the rotor 1 may comprise end shields 15. Then, the annular portion 111 can be mounted on the end shields 15. Notably, the two impregnation rings 11 may comprise a clamping system to fix the two impregnation rings 11 and the end shields 15.

Moreover, the two impregnation rings 11 have preferably a same radial position with respect to one another. Such a configuration of the two impregnation rings 11 eases a method for impregnating the windings 12.

In a preferred embodiment, the deflector portion 112 has an arcuately curved section. In addition, the deflector portion 112 then comprises an inner tip 114. The inner tip 114 has a terminal end located at an intermediary height of the protruding windings ends 121, so that to improve the even and in-depth impregnation of the windings 12. The intermediary height is preferably equal to a half of the protruding windings ends height. Thus, an outer peripheral portion of the windings 12 is efficiently impregnated with the resin.

The radial openings 113 may have an opening width and an opening length. Furthermore, the radial openings 113 are preferably distributed regularly along the annular portion 111. An opening distribution angle separates the radial openings 113. The opening width is adapted such that the annular portion 111 does not obstruct an application of the resin. Moreover, the opening length and a number of radial openings are adapted to optimize a total opening surface of the radial openings 113, in order to ease the application of the resin.

Additionally, the two impregnation rings 11 may comprise annular grooves in between the radial openings 113. Thus, the annular grooves ensure a fluid connection between the radial openings 113. The annular grooves are configured to guide the resin towards the radial openings 113. The annular grooves comprise a groove width preferably equal to the opening width.

The two impregnation rings 11 are preferably made out of a metal material.

Moreover, the two impregnation rings 11 may be used to perform negative balancing. The negative balancing consists in removing weight locally from either one of the two impregnation rings 11 to compensate an unbalanced weight distribution of the windings 12. The negative balancing may consist in drilling holes into either one or both of the two impregnation rings 11.

According to another aspect of the invention, detailed hereafter, the invention relates to the method for impregnating the windings 12.

In particular, the method according to the invention comprises: starting a rotation of the rotor shaft 13 and impregnating the windings 12 while the rotor 1 is rotating. The rotor shaft 13 is mounted horizontally on a rotating apparatus having a rotating velocity.

Two nozzles are respectively located upward each one of the two impregnation rings 11 and oriented towards the radial openings 113. Impregnating the windings 12 includes applying the resin from the two nozzles through the radial openings 113 onto the protruding windings ends 121 at a same time. The resin is guided by the deflector portion 112 in order to impregnate the windings 12 through the core length. Hence, the impregnation of the windings 12 is even and in-depth. The FIG. 1 illustrates a non-limiting schematic flowing path of the resin.

According to a first embodiment of the invention, the two impregnation rings 11 comprise the annular grooves. Thus, applying the resin step may be performed at once.

According to a second embodiment of the invention, applying the resin is performed at regular time intervals presenting an application frequency and an application duration. The frequency of the application and the application duration both preferably correspond to the rotating velocity, to the opening length, and to the opening distribution angle. Hence, applying the resin is occurring when the radial openings 113 are facing the two nozzles. Provided that the two impregnation rings 11 have the same radial position with respect to one another, the two nozzles have preferably same settings.

Applying the resin may consist in spraying or dripping the resin through the radial openings 113.

Although embodiments have been described with reference to a number of illustrative embodiments thereof, it should be understood that numerous other modifications and embodiments can be devised by those skilled in the art that will fall within the spirit and scope of the principles of this disclosure.

The technical advantages of the present invention will now be detailed.

The present invention has the following advantages regarding the manufacturing point of view. Contrary to the conventional impregnation method presented beforehand, the present invention allows to avoid having to incline the rotor. The present invention makes it possible to impregnate two sides of the rotor at the same time. Thus, a production time of the rotor is reduced. Furthermore, the present invention presents the advantage of limiting undesirable dripping of the resin. Thus, it reduces a risk of having to rework tarnished surfaces.

Moreover, the invention allows to impregnate completely the windings through the core length with an improved impregnation quality. Thus, the present invention makes it possible to design the rotor having a higher value of the core length while still maintaining a fair impregnation quality.

Regarding, a functional point of view, the two impregnation rings can serve several supplementary functions. For instance, the two impregnation rings may be used for balancing the rotor. Furthermore, the two impregnation rings may contribute to an increase of a mechanical strength of the rotor.

The invention claimed is:

1. A rotor of an electric rotating machine for a vehicle, the rotor comprising:
    a rotor shaft;
    a rotor core having a core length and comprising longitudinal grooves distributed along an outer circumference of the rotor core, the longitudinal grooves covering the core length, the rotor core being mounted on the rotor shaft;
    windings located within the longitudinal grooves and forming protruding windings ends at each end of the rotor core;
    two impregnation rings both having an annular shape and located at both ends of the rotor core;
    wherein each of the two impregnation rings comprises an annular portion and a deflector portion both joined to one another on an end, the annular portion comprising radial openings, the deflector portion facing the protruding windings ends and being configured to guide an impregnation agent from the radial openings towards the protruding windings ends for evenly and in-depth impregnating the windings.

2. A rotor as claimed in claim 1, comprising end shields, the annular portion being mounted on the end shields.

3. A rotor as claimed in claim 1, wherein the deflector portion has an accurately curved section.

4. A rotor as claimed in claim 3, wherein the deflector portion comprises an inner tip having a terminal end located at an intermediary height of the protruding windings ends.

5. A rotor as claimed in claim 1, wherein the radial openings have an opening width and an opening length, the radial openings being distributed regularly along the annular portion with an opening distribution angle between the radial openings.

6. A rotor as claimed in claim 1, wherein the two impregnation rings comprise annular grooves in between the radial openings, the annular grooves connecting fluidly the radial openings and being configured to guide the impregnation agent towards the radial openings.

7. A method for impregnating a rotor comprising a rotor shaft, a rotor core having a core length, windings, and two impregnation rings located at both ends of the rotor core, the windings forming at each end of the rotor core protruding windings ends, each one of the two impregnation rings comprising an annular portion and a deflector portion, the annular portion comprising radial openings having an opening length, being distributed regularly along the annular portion with an opening distribution angle between the radial openings, the method comprising:
    starting a rotation of the rotor shaft mounted on a rotating apparatus having a rotating velocity;
    impregnating the windings through two nozzles respectively located upward each one of the two impregnation rings and oriented towards the radial openings;
    wherein impregnating the windings includes applying an impregnation agent from the two nozzles through the radial openings onto the protruding windings ends at a same time, the impregnation agent being guided by the deflector portion in order to impregnate the windings through the core length.

8. The method as claimed in claim 7, wherein applying the impregnation agent is performed at regular time intervals with an application frequency and an application duration both corresponding to the rotating velocity, the opening length and the opening distribution angle being configured such that applying the impregnation agent is occurring when the radial openings are facing the two nozzles.

9. The method as claimed in claim 8, the two impregnation rings comprising annular grooves, wherein applying the impregnation agent is performed at once.

10. The method as claimed in claim 7, wherein applying the impregnation agent consists in spraying the impregnation agent through the radial openings.

* * * * *